United States Patent
Peterson et al.

(10) Patent No.: US 6,687,616 B1
(45) Date of Patent: Feb. 3, 2004

(54) POST-HARVEST NON-CONTAINERIZED REPORTING SYSTEM

(75) Inventors: Todd A. Peterson, Johnston, IA (US); Doug L. Gardner, Johnston, IA (US)

(73) Assignee: Pioneer Hi-Bred International, Inc., Des Moines, IA (US)

(*) Notice: Subject to any disclaimer, the term of this patent is extended or adjusted under 35 U.S.C. 154(b) by 0 days.

(21) Appl. No.: 10/237,809

(22) Filed: Sep. 9, 2002

(51) Int. Cl.[7] .............................................. G06F 19/00
(52) U.S. Cl. ........................................................ 702/5
(58) Field of Search ........................... 702/2, 5; 701/50

(56) References Cited

U.S. PATENT DOCUMENTS

| | | |
|---|---|---|
| 5,699,244 A | 12/1997 | Clark, Jr. et al. |
| 5,987,384 A * | 11/1999 | Matson ........................... 702/2 |
| 6,002,984 A * | 12/1999 | Aughenbaugh ................. 702/2 |
| 6,119,531 A | 9/2000 | Wendte et al. |
| 6,141,614 A * | 10/2000 | Janzen et al. .................. 701/50 |
| 6,216,071 B1 * | 4/2001 | Motz ............................ 701/50 |
| 6,236,924 B1 * | 5/2001 | Motz et al. .................... 701/50 |
| RE37,574 E | 3/2002 | Rawlins |
| 6,360,179 B1 * | 3/2002 | Reep ........................... 702/104 |
| 6,385,544 B1 * | 5/2002 | Mafra-Neto .................... 702/5 |

FOREIGN PATENT DOCUMENTS

WO      WO 00/42562      7/2000

* cited by examiner

*Primary Examiner*—Donald E. McElheny, Jr.
(74) *Attorney, Agent, or Firm*—Pioneer Hi-Bred International, Inc.

(57) ABSTRACT

The present invention provides a post-harvest reporting system that includes an apparatus and method for using time-stamped and location-based data recorded from multiple GPS receivers uploaded to a central information system. The apparatus and method include a GPS receiving device and a data logging device mounted on each of various vehicles used to harvest and transport crop from the field to a final storage place, and a way to upload the data to a central information system and generate reports therefrom. Data is input into the central information system such that data integrity checks can be performed. Reports are generated which track the path of a load of crop from harvest to storage; can be used to evaluate efficiency of the harvest operation; will track yield in certain portions of a field; and source a particular load of crop to certify its origin.

23 Claims, 3 Drawing Sheets

POST-HARVEST NON-CONTAINERIZED REPORTING SYSTEM

BACKGROUND OF THE INVENTION

1. Field of the Invention

The present invention relates in general to a post-harvest non-containerized reporting system, more specifically, a method of using spatial and time-stamped data recorded from GPS receivers mounted on grain harvest and transport vehicles to track agricultural products through the harvest process. Information about the time and location of vehicles involved in the harvest and transport of the grain or other agricultural product is collected and analyzed using a geographic information system. The output of this invention is the electronic tracking of a defined quantity or load of the product from harvest to storage which can be used to evaluate and optimize the efficiency of the harvest and transport operation and/or validate the process integrity based on data from multiple GPS receivers.

2. Description of the Prior Art

There are a multitude of situations for which data regarding yield, field characteristics, and equipment operation during harvest is useful. The use of GPS (Global Positioning System) receivers and on-the-go yield monitoring equipment to collect yield map information is common in modem farm operations. Yield maps enable growers to evaluate and optimize production practices in each area of each field. These technologies also enable collection of location- and time-stamped data that provide an electronic verification of field operations. There are many ways this information could be used.

This kind of information would be beneficial if a grain buyer contracted with grower/producers and needed information about yield from each grower and/or for each field, and needed to associate that information with the growers' contract and with the batch or lot of crop that is harvested. In addition, an individual farmer could make use of this information to provide yield data not only obtained from a particular field but the yield pattern within that field. Furthermore, information associated with a crop produced in a contracted field would be desirable to help provide quality assurance data. And, for some food and export markets, buyers may need assurance that the crop is free from contamination by genetically modified organisms (GMO's). Finally, tracking certain equipment use could be employed to determine and optimize efficiency of the harvest operation.

It is known in the art to use pre-loaded GPS (global positioning satellites) receiver locations and uniquely identified crop markers such that when the location of the harvester matches a pre-selected GPS location, a crop marker is dispensed into the crop stream during harvest. Later analysis of crop near the marker provides crop characteristic mapping within a field. (See U.S. Pat. No. RE37,574E). Or, analysis can be done at the time of gathering the sample and recorded. In this instance, the sample is gathered according to pre-determined GPS locations and analysis is done directly. (See U.S. Pat. No. 6,119,531).

It is also known in the art to use a handheld graphic user interface (GUI) personal digital computer coupled to a GPS receiver for hand entry and recordation by the user of information tied to location. This information can include that such as herbicide and fertilizer application, soil type, crop history per field, graphic representations of each field including landmarks, tillage records by date and equipment used, tile maps, etc. (See U.S. Pat. No. 5,699,244).

There are also systems in use which track and transmit current locations of a vehicle. These systems are most often used in fleet management operations to verify delivery of a package or to signal a driver that there is a pick up to be made near his present location. One such system transmits the time and location of a vehicle and comparison is made to the time and location expected for that vehicle on a pre-mapped and timed route. Status signals are sent to a messagecenter if the expected location is not reported for the expected time. (See International Publication No. WO 00/42562).

Although some uses of GPS locations paired with crop data and some uses of GPS locations paired with vehicle routes have been made, there still remains a set of unmet data and reporting needs.

It would be desirable to be able to report the location within a field from which a particular load of grain or other agricultural product was harvested and be able to verify exactly the route the load took from combine to elevator or bin without resorting to a containerized system.

For large companies which contract crop production with many growers, it is desirable for the company to be able to track harvested crop by grower, by field, even by load to tabulate yield, harvest efficiency, and integrity of harvest to delivery.

In order for such a harvesting tracking system to provide the necessary data, the system should include built-in integrity checks, should require only minimal manual intervention, should provide data which is easily associated in pairs or more, can be segregated into various sets, and is transportable. The present invention differs from the above referenced inventions and others similar in that these prior devices do not meet the needs outlined wherein the present invention has been designed to do so.

SUMMARY

The present invention provides a method and a system for tracking and associating multiple pieces of location-based and time-stamped data. However, prior to providing a summary of the present invention, it will be useful to the reader to understand the general harvesting process and to realize that there are variations of this process per crop, per grower, and per geographic area.

When a field is harvested there are usually at least three mobile vehicles in the field each with different roles. There is the harvesting machine or combine which is the machine that actually gathers the plants or crop and collects it in a holding tank. Also, there is a grain cart. When the holding tank of the combine is full, the grain cart is moved into position next to the combine and an auger or other means transports the grain from the combine holding tank into the grain cart In the present invention, the crop in the holding tank of the combine is considered one load. The significance of this will be explained below. The unloading of the combine or harvesting machine can be accomplished while the combine and the grain cart move, in tandem, so that the time used for unloading is not lost from harvesting. Even if not transferred on the move, it is far more efficient to transfer a load into a grain cart which is in position next to the combine than to turn the combine out of the field and take it to another location to unload, especially where the combine's holding tank is full somewhere in the middle of the field rather than at either end.

The grain cart then either waits for the combine to unload again and fill the grain cart or, if full, the grain cart transports the crop in its holding tank to the edge of the field where a truck awaits. The grain cart is also equipped with means for unloading its cargo so that it transfers the crop in the cart to the truck. Depending on the relative sizes of the cart and the truck, it may take several grain carts full of crop to fill a truck. However, once full, the truck transports the crop to a storage place. The storage place is most often an elevator or a large grain bin. Typically, if taken to an elevator, the truck is driven across a scale full and weight and time is recorded. Then the grain is removed from the truck, and the truck is again weighed empty to estimate the amount of grain delivered in that load. The process used to harvest any one field may include multiple combines, grain carts, and trucks.

The present invention starts with assigning a digital identification for each vehicle through association of a GPS receiver and a data logging device with each vehicle. In addition, the boundary of each field for which data will be collected is pre-mapped and stored in a geographic information system. Each field is also assigned a digital identification. Field boundaries are usually assigned a buffer zone of about 200 feet outside the field periphery to insure that harvest or transport vehicles will be associated with a given field even if they move adjacent to or are parked outside the immediate field periphery of harvested crop At time of harvest, a first GPS receiver (preferably a dGPS receiver) located on a harvesting machine or combine is associated with an unloading mechanism of the combine such as an auger. The combine has a holding tank. The association is such that GPS location data is recorded for the time the combine is unloading its holding tank, whether it is moving or stationary. In the preferred embodiment, the first GPS receiver can record two channels for data and the second is associated with a yield monitor. This association allows yield to be tracked with very specific areas in a field.

A second GPS receiver with a data logging device is mounted on a grain cart with a holding tank and records intermittent location and time data. After the combine has unloaded into the holding tank on the grain cart, the grain cart either positions itself for the next load from the combine or, if it is full, transports crop to a waiting truck. The grain cart also is equipped with means to transfer crop (e.g, a grain auger)which is further and discreetly associated with the grain cart's location via the GPS receiver. In addition to recording periodic time and location data from the cart whenever the GPS receiver is on, the data logger also records time and location data from the time means to transfer crop from the grain cart is actuated until the time it is stopped.

A third GPS receiver is mounted on a truck. The truck is also equipped with means to transfer crop and a holding tank for said crop. This GPS receiver may record time-stamped and location-based data continuously, or it may be programmed to collect and store data only when the truck is in motion. A truck is parked much of the time during a typical grain harvest operation, and recording the location of a stationary vehicle wastes storage memory resources unnecessarily. Therefore, if the truck stops for more than a pre-selected amount of time, the GPS receiver ceases to record data until the truck moves again thereby providing a time gap in the data recorded which indicates stoppage. If the data shows a time gap, the location can be checked later to see if the stationary location was in a field, at a scale, or whether the stop occurred at an elevator or bin for unloading.

Once at the elevator, the truck is driven onto scales and the time and weight recorded. Then, the truck is unloaded and the truck is driven back across the scales and the time and weight recorded on the same receipt providing the last link in the data. If the truck is unloaded at a bin rather than a commercial elevator, the last link in the data is provided by the GPS data from the truck.

Each of the GPS receivers on each of the vehicles is equipped with means by which to upload the data recorded to a central geographic information system (GIS). Such means may be through pre-set periodic cellular phone transfers or other wireless automatic transfers or through physical collection on disks or cards from each GPS receiver and manual uploading from that point.

A variety of reports can be generated from the information recorded by the various GPS receivers. By way of example, the system can report from which portion of the harvested field a load (one load comprises the crop moved from the holding tank of the combine) was obtained and what time it was delivered to the elevator. It can provide an integrity check to make sure the truck proceeded directly from the field to the elevator or storage bin, and did not stop somewhere on the way; it can determine the yield per acre on the loads in the truck and the system can determine the location and land area from which those loads were harvested; and can associate field, time-stamped and location-based data in order to provide efficiency reports. Data can be queried and reported by field, by vehicle, by load, or by farmer/grower name or contract, depending on the information that is input into the system.

In general, the data association between vehicles is done by the GIS through comparison of time and location data of one vehicle to the same kind of data for other vehicles in the system; when a vehicle whose time and location data are within closest proximity to the first during the unloading operation, then data from the first and second vehicles are linked. This process of using the GPS location and time-stamp to link each grain transfer operation is repeated over and over, thereby linking the data associated with one crop load, and providing the electronic record that tracks and identifies a given load from harvest to storage.

The system develops and verifies process integrity through the tracking of each step in the harvest process (i.e., each product transfer), and leverages the fact that determining a location using a GPS receiver also generates accurately time stamped data. Data including the location, time, and unloading status of independent mobile harvest and transport vehicles moving in unpredictable patterns can be consolidated into a report that verifies and tracks the integrity of specific harvested quantities from the field where it is grown to storage.

The present invention also provides the method by which the data in the system is collected and associated with the process of harvesting a crop and contemplates the application of the method using other location and time tracking and wireless data communication devices including those not yet developed.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
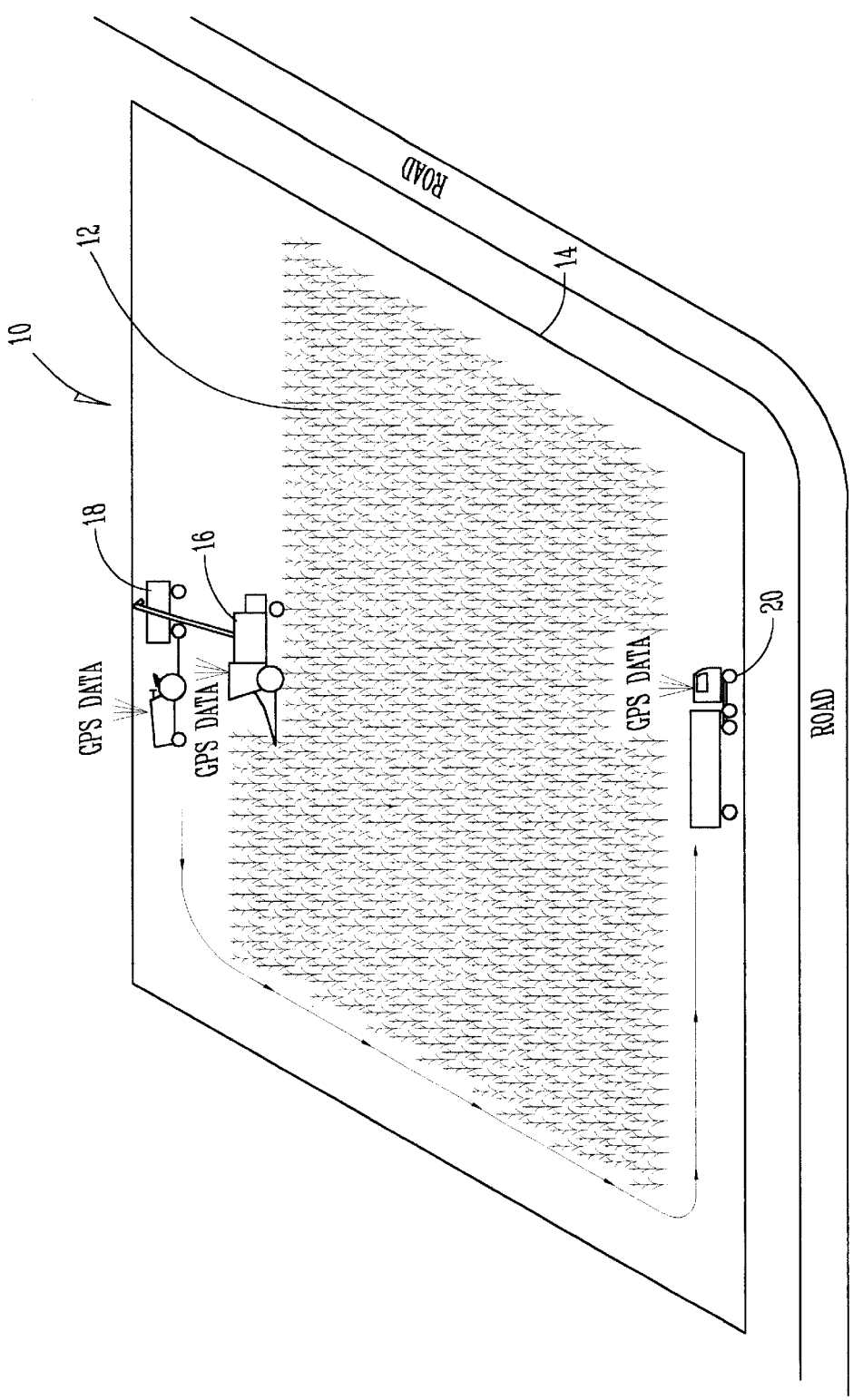
FIG. 1 diagram showing field with boundaries, crop, and each one of a plurality of vehicles employed by the system of the present invention.

FIG. 1 shows a field 10 in which a preferred embodiment of the present invention of a post-harvest GPS-based reporting system is employed. The system is utilized with the field 10 having a crop 12 and field-boundaries 14, and includes a plurality of vehicles 15 that serve as means 17 for harvesting said crop 12 which, in the preferred embodiment consist of a combine 16, a grain cart 18, and a transportation vehicle 20. Also, in the preferred embodiment, the transportation vehicle is a truck.

Figure 2:
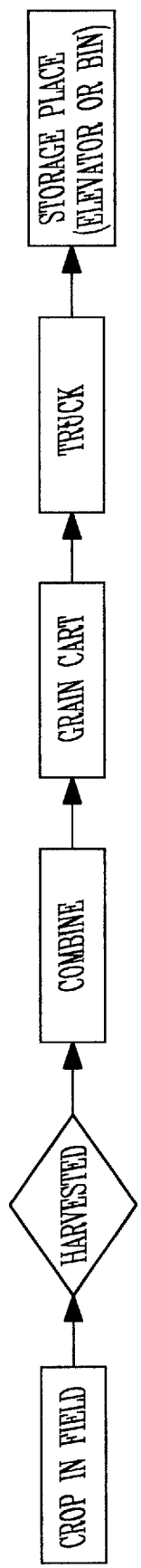
FIG. 2 simple flow chart of grain travel during harvest using the present invention.

In general and as shown by the flow chart in FIG. 2, the combine 16 gathers a load of crop 22 and transfers it to the grain cart 18. From the grain cart 18 one or more of the loads of crop 22 is transferred to the truck 20 and then transported to a final storage location 24. It should be noted that within field boundaries 14 there may be a plurality of combines 16, a plurality of grain carts 18, and a plurality of trucks 20. More specifically, the combine 16 comprises a first holding tank 30 for receiving the load of crop 22, a first GPS receiving device 32 and a first data logging device 33 and means 34 for transferring the load of crop 22 out of the first holding tank 30 and into the grain cart 18. The grain cart 18 comprises a second GPS receiving device 36 and a second data logging device 37, a second holding tank 38 for receiving at least one of the loads of crop 22 and means 39 for transferring said at least one load of crop 22 into the truck 20. The truck 20 includes a third GPS receiving device 40, a third data logging device 41 and a third holding tank 42 for receiving said at least one load of crop 22.

Figure 3:
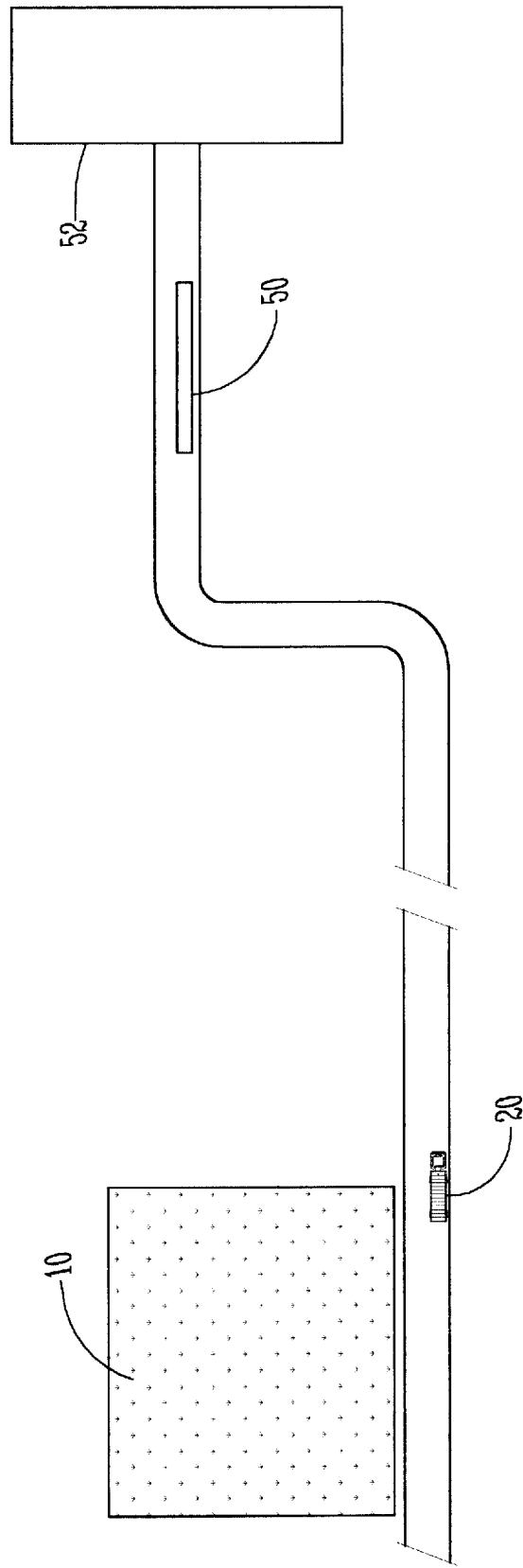
FIG. 3 diagram showing route of transfer of loads to elevator with scales.

The final storage location is shown as 24 in FIG. 3. In the preferred embodiment, this final storage location 24 comprises commercial scales 50 across which the truck 20 is driven and weighed when full and again when empty, and an elevator 52 into which the third holding tank 42 in the truck 20 is unloaded. Time of delivery 51 of at least one of the loads of crop 22 is recorded.

The first, second, and third GPS receiving devices 32, 36 and 40, respectively, receive GPS data and the first, -second, and third data logging devices 33, 37 and 41, respectively, all periodically record time-stamped and location-based data during a harvesting operation. The first GPS receiving device 32 and first data logging device 33 are also associated with the transfer means 34 such that the data logging device 33 creates a data string recording the time-stamped and location-based data when the means 34 is actuated. Simultaneously, the second GPS receiving device 36 receives and the second data logging device 37 located on the grain cart 18 also records a discreet time and location data string when the transfer means 39 is actuated. The third GPS receiving device 40 receives and the third data logging device 41 located in the truck 20 only records time-stamped and location-based data when the truck 20 is moving. In the preferred embodiment, the third GPS receiving device 40 and the third data logging device 41 stops recording time-stamped and location-based data when the truck 20 has not moved for five minutes.

The first, second, and third GPS receiving devices 32, 36, and 40, respectively, and the first, second and third data logging devices 33, 37 and 41 respectively, are preferably associated with means 54 for uploading data and with a central information system means 60 for storing, linking and associating the uploaded data with the boundaries 14 of the field 10. In one modified embodiment, the means 54 for uploading data comprises memory cards in each data logging device 33, 37, 41, respectively, which are removed and transported to be uploaded into the means 60 for sorting, linking, and associating the uploaded data. In a second modification of the preferred embodiment, wireless, automatic, periodic transfer of data from each data logging device 33, 37, and 41 to the means 60 occurs using analog or digital cellular telephone technology. In a third modification of the preferred embodiment, wireless transfer of data from each data logging device 33, 37, and 41, respectively, to the means 60 occurs using short-range radio transmission only when said vehicles 16, 18, and 20 return to a location proximal to a farm's home office which is equipped with a radio receiver of the appropriate frequency and connected to a standard computer. An example of a data logging device (33, 37 or 41) and means 54 is a set called the P2000 produced by GPS Management Systems which includes a mobile data logger which can be mounted on a grain cart 18 or truck 20 or combine 16 and a separate stationery wireless data receiver which would be located in the office to receive downloaded data from the data loggers (33, 37 or 41) and feed the data to a computer. The P2000 is especially useful in that it includes a separate channel for logging GPS data of a discreet event such that data can be logged relative to the operation of the transfer means 39. This is especially useful for use if a yield monitor on a combine is to be associated with one data string and the operation of the auger is so be associated with another. In the preferred embodiment, the storing, linking and associating means 60 comprises a computerized, geographic information system with the capability to create and generate reports.

Figure 4:
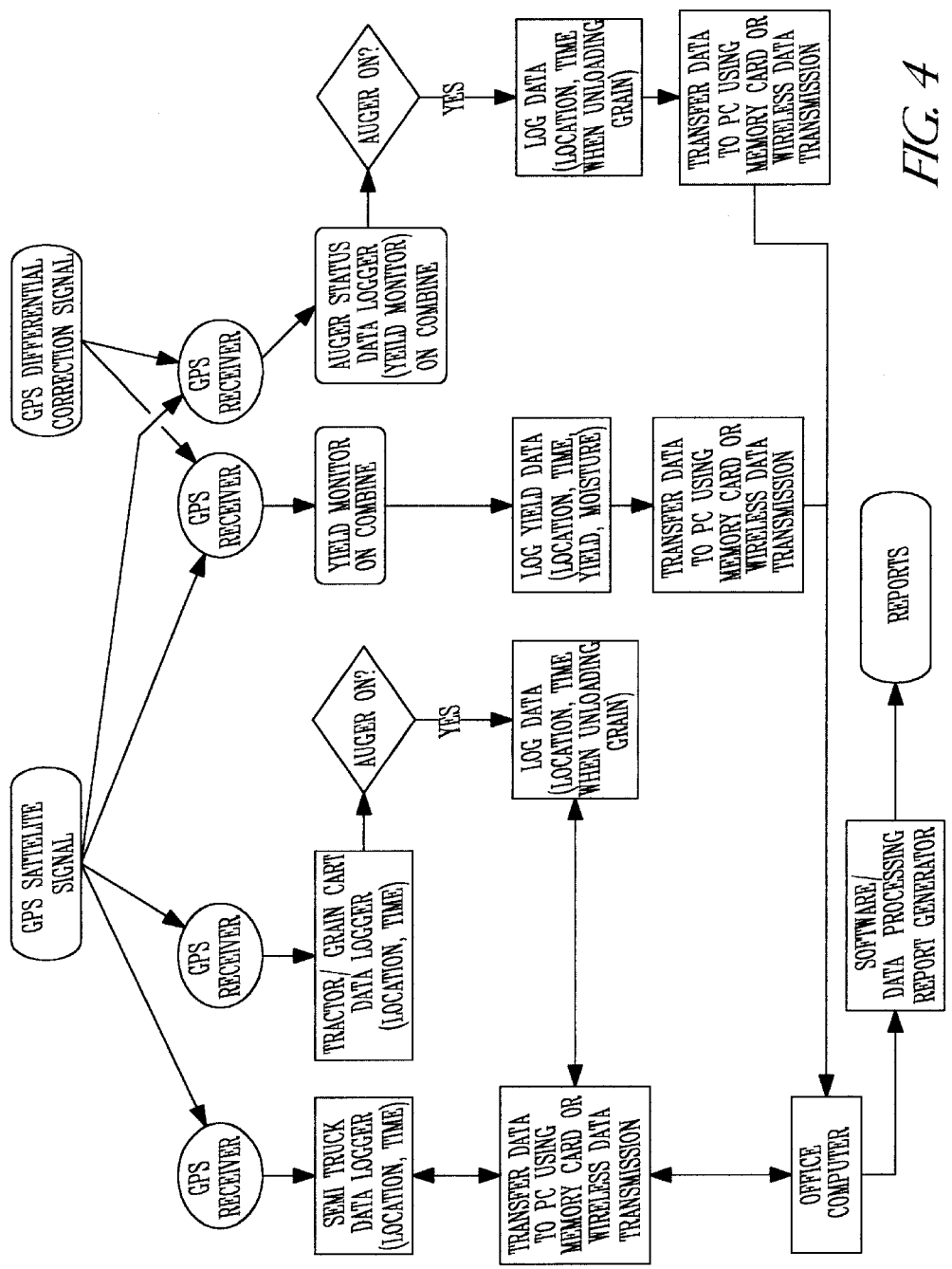
FIG. 4 flow chart showing steps in the system of the present invention.

The flowchart in FIG. 4 shows the operation and steps used for the system shown and described in FIGS. 1–3 above. The first step 68 is to record and store GPS locations 70 along the boundaries 14 of the field 10. In the preferred embodiment, a buffer zone 71 of about 200 feet outside of the actual perimeter of the field 10 is encompassed in these stored measurements creating boundaries 14. The buffer zone outside of the harvested crop area is defined to assure that a harvest or transport vehicle's contents will be associated with that field's records even if the vehicle never enters the actual field's perimeter. Occasionally, large trucks for transporting harvest may remain outside of, and adjacent to the perimeter of the field being harvested to ease access and loading. This information is recorded, along with a digital identifier to designate the field, in the geographic information system.

The second step 72 is to record the GPS locations 74 of any final storage places 24 into which the crop 12 from the field 10 may be stored. The third step 76 is to associate an identifier 77 with and to begin the harvesting operation using the combine 16, at least one of the grain carts 18, and at least one of the trucks 20.

During the third step 76 depicted on the FIG. 4 flow chart, time-stamped and location-based data 80 is recorded by each of the data logging devices 33, 37, and 41 according to its changing locations and associated with the identifier 77. The second data logging device 37 also records a discreet data string of GPS time-stamped and location-based when the means 39 for transferring contents of the second holding tank 38 are actuated. In the fourth step 82, the time-stamped and location-based data 80 recorded by each of the data logging devices 33, 37, 41 are transferred by the means 54 for uploading data to the central information system means 60 with report creating and generating capability. In the preferred embodiment the means 54 comprises wireless, automatic, periodic transfer of data via digital telephone technology and said central information system means 60 is a geographic information system (GIS).

The fifth step 90 in the system comprises using the central information system 60 to associate various pieces of data to compile reports and generate them for use. In general, the data association between each of the vehicles (16, 18 or 20) in the field 10 is done by the GIS 60 through comparison of time-stamped and location-based data of one vehicle to the same kind of data for all other vehicles in the field at the same time; when another vehicle whose time-stamped and location-based data match or are within close enough proximity to the first, then data from the first and second is linked, and so forth, until data has been associated which traces the path of transportation of the load 22 from field 10 to delivery at the final storage place 24.

Because the system is based on independently generated data (GPS location-based and time-stamped) as well as fact-specific information that is predetermined such as field boundaries and the nature of each vehicle (truck or grain cart or combine) the system is one of high data integrity. It can be set to check for anomalies (values outside of a normal range) and can recognize them e.g. a combine unloading at 50 mph would be an anomaly. The reports also provide information regarding yield, efficiency, and integrity. More specifically, but by way of example only:

Report 1: Associates time and location data for each crop load combined within the boundaries of a field and associates this data via linkages of time and proximity, to the weight recorded for the trucks unloaded which originated from that field. This report can provide yield information for the entire field or for just a single crop load. In addition, yield information for a single crop load can be mapped with the geographic location from which the crop load originated in the field.

Report 2: Associates time and location data of each truck from time it is loaded and crosses the field's boundaries to leave the field through the time it is emptied. This data can be used to ascertain whether and what stops were part of the route from field to final storage place which, in turn, provides assurance-of-source reports for the load delivered to the final storage place. In further association with time and location data of the grain cart and the combine which provided crop transported by this truck load, a full integrity check can be generated for sourcing crop.

Report 3: Associates field identifiers and boundaries with time and location data of truck loads coming from that field, weight of crop delivered by said truck loads to final storage place, and, if desired, with farmer/grower name and/or contract number. Such association provides a way to calculate the weight of crop (across fields, if desired) produced by a particular grower under a particular contract.

Thus, the present invention has been described in an illustrative manner. It is to be understood that the terminology that has been used is intended to be in the nature of words of description rather than of limitation.

Many modifications and variations of the present invention are possible in light of the above teachings. For example, different vehicles used for harvesting are likely to be developed in the future and, where applicable, these should be considered as contemplated by the claims. In addition, a large variety of reports can be generated. As technology progresses, there will be other ways to transfer and store data which should be considered part of the claims. Therefore, within the scope of the appended claims, the present invention may be practiced otherwise than as specifically described.

What I claim is:

1. A post-harvest GPS-based reporting system comprising:
   a) a field of crop for which GPS location-based boundaries are pre-mapped and recorded;
   b) means for harvesting said field of crop including a first GPS receiving device, a first data logging device, a first holding tank to store a load of crop that has been harvested from an identifiable portion of said field of crop, and means for transferring said load out of said holding tank wherein said first receiving device and said first data logging device records a discreet GPS data string associated with actuation of said means for transferring said crop load;
   c) a grain cart comprising a second holding tank for receiving at least one said crop load from said means for harvesting, and a second GPS receiving device and a second data logging device;
   d) a transportation vehicle comprising a third holding tank for receiving at least one said crop load from said grain cart, and a third GPS receiving device and a third data logging device;
   e) said grain cart further comprising means for transferring said at least one crop load to said third holding tank in said transportation vehicle wherein said second GPS receiving device and said second data logging device records a discreet GPS data string associated with actuation of said means for transferring said at least one crop load;
   f) a final storage location for receiving said third holding tank of said at least one crop load and at which recordable data is established concerning the time of delivery of said crop load to said location;
   g) means for uploading data received by said first, second and third GPS receiving devices and recorded by said first, second and third data logging devices; and
   h) means for storing, linking and associating said uploaded data and said GPS location boundaries for said field based upon the time of delivery of said crop load to said final storage location, and to create and generate reports of same.

2. A post-harvest GPS-based reporting system as claimed in claim 1 wherein said means for harvesting said field of crop further comprises a combine.

3. A post-harvest GPS-based reporting system as claimed in claim 1 wherein said means for transferring said crop load out of said first holding tank and said means for transferring said at least one said crop load from said second holding tank to said third holding tank each comprises an auger.

4. A post-harvest GPS-based reporting system as claimed in claim 1 wherein said final storage location for said third holding tank of said at least one crop load comprises a grain elevator wherein said transportation vehicle is driven across commercial scales where weight and time of time are recorded, said at least one crop load in said third holding tank in said transportation vehicle is unloaded into said grain elevator, and said transportation vehicle is driven across commercial scales again where weight and time of delivery are recorded.

5. A post-harvest GPS-based reporting system as claimed in claim 1 wherein said means for uploading data comprises collecting and transporting a memory card from each of said data logging devices to said means for storing, linking and associating said uploaded data.

6. A post-harvest GPS-based reporting system as claimed in claim 1 wherein said means for uploading data received by each said GPS receiving device and recorded by each said data logging device comprises wireless, automatic, periodic transfer of data via digital telephone technology to said means for storing, linking and associating said uploaded data.

7. A post-harvest GPS-based reporting system as claimed in claim 1 wherein said first GPS receiving device and said first data logging device receive and record only when said means for transferring said crop load out of said first holding tank is actuated, said second GPS receiving device receives and said second data logging device records periodically, and said third GPS receiving device receives and said second data logging device records only when said transportation vehicle is moving.

8. A post-harvest GPS-based reporting system as claimed in claim 1 wherein said means for storing, linking and associating said uploaded data and said GPS location-based boundaries for said field, and to create and generate reports of same comprises a geographic information system.

9. A post-harvest GPS-based reporting system comprising:
  a) a field in which crop is grown comprising pre-mapped boundaries defined by GPS location-based data;
  b) means for harvesting said field of crop comprising a first holding tank for a crop load, a first GPS receiving device, and a first data logging device;
  c) a plurality of vehicles each comprising a holding tank for transporting at least one said crop load;
  d) a plurality of GPS receiving devices, a plurality of data logging devices, each of said plurality of GPS receiving devices associated with one of said plurality of data logging devices and one of said plurality of vehicles;
  e) each of said plurality of vehicles further comprising means for transferring said at least one crop load out of said holding tank;
  f) a storage location;
  g) means for uploading data received by said first GPS receiving device and recorded by said first data logging device and each of said plurality of GPS receiving and each of said plurality of data logging devices; and
  h) means for storing, linking and associating said uploaded data by time and location and with said pre-mapped boundaries.

10. A post-harvest GPS-based reporting system as claimed in claim 9 wherein said plurality of vehicles further comprises at least one grain cart for transporting said at least one crop load from said means for harvesting said crop and at least one truck for transporting said at least one crop load from said at least one grain cart to said storage location.

11. A post-harvest GPS-based reporting system as claimed in claim 10 wherein said means for transferring said at least one crop load out of said holding tank of said grain cart comprises an auger.

12. A post-harvest GPS-based reporting system as claimed in claim 10 wherein said means for uploading data received by said first GPS receiving device and recorded by said first data logging device and each of said plurality of GPS receiving devices and data logging devices comprises transportable memory cards.

13. A post-harvest GPS-based reporting system as claimed in claim 10 wherein said means for uploading data received by said first GPS receiving device and recorded by said first data logging device and each of said plurality of GPS receiving devices and data logging devices comprises a wireless, automatic, periodic transfer of data using digital telephone technology.

14. A post-harvest GPS-based reporting system as claimed in claim 13 wherein said means for storing, linking and associating said uploaded data with said pre-mapped boundaries comprises a geographical information system with report creation and generation capabilities.

15. A post-harvest GPS-based reporting system comprising:
  a) a field of crop with a perimeter for which boundaries defined by GPS locations have been pre-mapped said boundaries including a buffer zone of about 200 feet beyond said perimeter;
  b) a combine comprising a first holding tank for a load of crop, a first GPS receiving device, a first data logging device, and a first auger for transferring said crop load out of said first holding tank wherein said first data logging device operates to record time-stamped and location-based data only when said first auger is transferring said load;
  c) a grain cart comprising a second holding tank for receiving at least one said crop load from said combine, a second GPS receiving device, a second data logging device, and a second auger for transferring said at least one crop load out of said second holding tank wherein said second data logging device operates to record time-stamped and location-based data when said second auger is not actuated and to record a discreet data string of time-stamped and location-based data when said second auger is actuated and transferring said at least one crop load from said second holding tank;
  d) a truck comprising a third holding tank for receiving said at least one crop load from said second holding tank of said grain cart, and a third GPS receiving device, and a third data logging device, wherein said third data logging device operates to record location-based and time-stamped data when said truck is moving;
  e) a grain elevator wherein said truck is weighed and time recorded prior to and after said truck transfers said at least one crop load from said third holding tank to said elevator;
  f) means for uploading data from said first, second, and third data logging devices comprises wireless, automatic, periodic transfer of data using digital telephone technology;
  g) a geographic information system for storing, linking and associating said periodic uploads of data wherein said data is associated according to proximity of said combine, said grain cart, and said truck as determined by time-stamped and location-based data received by said first, second, and third GPS receiving devices and recorded by said first, second, and third data logging devices and by said boundaries; and
  h) said geographic information system has the capability to create and generate reports.

16. A method for providing a post-harvest GPS-based reporting system comprising:
  a) Recording and storing GPS locations around a field of crop comprising boundaries and assigning an identifier to said field;
  b) Recording and storing GPS locations corresponding to at least one final crop storage place and assigning an identifier to said at least one final storage place;

c) Harvesting said field of crop using
1. at least one combine for gathering a load of crop, at least one grain cart for transporting at least one said load of crop, and at least one truck for transporting said at least one said load of crop from said at least one grain cart to said at least one final crop storage place;
2. said at least one combine comprising first means for transporting said load of crop to said grain cart;
3. said at least one grain cart comprising second means for transferring at least one load of said crop to said truck;

d) Assigning identifiers to said at least one combine, said at least one grain cart, and said at least one truck;

e) Recording and storing GPS location-based and time-stamped corresponding to the location of said at least one combine upon actuation of said first means for transferring said load of said crop, and to the location of said at least one grain cart both upon actuation of said second means for transferring said at least one load of said crop and when said grain cart is moving, and to the location of said at least one truck as it transports said at least one load of said crop to said final storage place;

f) Uploading all GPS location-based and time-stamped data recorded and stored to a central information system and associating said uploaded data by identifiers and by matching proximity of said combine to said at least one grain cart, said grain cart to said at least one truck, and said at least one truck to said at least one final crop storage place;

g) Inputting acceptable speeds for said at least one grain cart, said at least one combine, and said at least one truck and acceptable locations for stoppage of said at least one truck into said central information system;

h) Running data integrity checks by comparing said acceptable speeds and said acceptable locations to said GPS times and locations recorded for said at least one combine, said at least one grain cart, and said at least one truck; and i) Generating post-harvest reports using said GPS time-stamped and location-based data recorded for said field boundaries, said final storage places, said at least one combine, said at least one grain cart, said at least one truck and said identifiers.

17. The method of claim 16 wherein said central information system comprises a geographic information system and said post-harvest reports can be geographically presented.

18. The method of claim 16 wherein said GPS time-stamped and location-based data are received by a plurality of GPS receiving devices and recorded by a plurality of data logging devices one of each of which is mounted on said at least one combine, said at least one grain cart, and said at least one truck.

19. The method of claim 18 wherein said GPS time-stamped and location-based data are input to said geographic information system via wireless, automatic, periodic uploads of data by digital telephone technology from each said plurality of data logging devices.

20. The method of claim 16 wherein said post-harvest reports include yield per load, yield per field, yield per portion of field, efficiency reports regarding transportation per field, integrity check reports per field, integrity check reports per load, and assurance-of-source reports.

21. The method of claim 16 wherein said at least one final storage place comprises a grain elevator which includes a weigh scales upon which said truck is weighed before and after unloading said at least one load of crop and a receipt generator for generating a receipt showing weight of said truck before and after unloading and time recorded for each.

22. The method of claim 21 wherein said time on said receipt and said identifier of said truck is input to said central information system.

23. A method for providing a post-harvest GPS-based reporting system comprising:
a) Recording and storing GPS locations around said field of crop comprising boundaries and assigning an identifier to said field;
b) Recording and storing GPS locations corresponding to at least one final crop storage place and assigning an identifier to said at least one final storage place;
c) Harvesting said field of crop using
1. at least one combine for gathering a load of crop and a plurality of vehicles for transporting at least one load of crop;
2. said at least one combine comprising first means for transferring said load of crop;
3. each of said plurality of vehicles comprising means for transferring at least one said load of crop to another of said vehicles;

d) Assigning identifiers to said at least one combine, and each of said plurality of vehicles;

e) Recording and storing GPS location-based and time-stamped data corresponding to the location of said at least one combine upon actuation of said first means for transferring said load of said crop, and to the location of each of said plurality of vehicles as it transports said at least one load of said crop;

f) Uploading all GPS location-based and time-stamped data recorded and stored to a central information system and associating said uploaded data by identifiers and by matching proximity of said combine and each of said plurality of vehicles and to said final crop storage place;

g) Inputting acceptable speeds for each of said plurality of vehicles and said at least one combine into said central information system;

h) Running data integrity checks by comparing said acceptable speeds and said acceptable locations to said GPS time-stamped and location-based data recorded for each of said plurality of vehicles; and i) Generating post-harvest reports using said GPS time-stamped and location-based data recorded for said field boundaries, said final storage places, said at least one combine, each of said plurality of vehicles and said identifiers.

* * * * *